US009178585B2

(12) United States Patent
Shi et al.

(10) Patent No.: US 9,178,585 B2
(45) Date of Patent: Nov. 3, 2015

(54) PILOT CHANNEL CONFIGURATION FOR MIMO NETWORK

(71) Applicants: Nianshan Shi, Järfälla (SE); Cagatay Konuskan, Stockholm (SE); Sairamesh Nammi, Stockholm (SE)

(72) Inventors: Nianshan Shi, Järfälla (SE); Cagatay Konuskan, Stockholm (SE); Sairamesh Nammi, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 162 days.

(21) Appl. No.: 13/826,000

(22) PCT Filed: Mar. 15, 2013

(86) PCT No.: PCT/SE2013/050258
§ 371 (c)(1),
(2) Date: Mar. 26, 2013

(87) PCT Pub. No.: WO2013/137814
PCT Pub. Date: Sep. 19, 2013

(65) Prior Publication Data
US 2014/0079144 A1    Mar. 20, 2014

Related U.S. Application Data

(60) Provisional application No. 61/611,957, filed on Mar. 16, 2012.

(51) Int. Cl.
*H04B 7/00* (2006.01)
*H04B 7/04* (2006.01)
(Continued)

(52) U.S. Cl.
CPC ............ *H04B 7/0426* (2013.01); *H04B 7/0413* (2013.01); *H04B 7/0684* (2013.01); *H04W 52/325* (2013.01)

(58) Field of Classification Search
CPC .............. H04L 5/0007; H04L 5/0048; H04L 2025/03414; H04L 27/2647; H04L 25/0204; H04L 25/03343; H04L 5/0058; H04L 5/005; H04L 5/006; H04L 5/0091; H04B 7/0842; H04B 7/0413; H04B 1/76; H04B 7/0452; H04B 7/0495; H04B 7/0617; H04B 7/086
USPC ......... 370/216, 242, 280, 329, 335, 441, 468; 375/146, 147, 260, 295, 316, 267, 299, 375/340; 455/509, 550.1, 562.1, 561, 517
See application file for complete search history.

(56) References Cited

U.S. PATENT DOCUMENTS 7,035,662 B2 *    4/2006    Lee ................................ 455/522
2005/0043051 A1 *    2/2005    Takano et al. ................. 455/522
(Continued)

FOREIGN PATENT DOCUMENTS

WO    2013115706 A2    8/2013

OTHER PUBLICATIONS

3GPP TSG RAN WG1 #67, San Francisco, CA, USA, Nov. 14-18, 2011.*

(Continued)

*Primary Examiner* — Golam Sorowar
(74) *Attorney, Agent, or Firm* — Coats & Bennett, P.L.L.C.

(57) ABSTRACT

Embodiments of the present disclosure provide methods and apparatus for configuring additional CPICHs, e.g. third CPICH, fourth CPICH, etc., to support MIMO transmissions of rank three or higher. The additional CPICHs may be configured with two or more power levels. A radio network controller (RNC) sends configuration information for the additional CPICHs to a serving base station in a cell to configure the additional CPICHs. The additional CPICHs can be configured to have a fixed power level, or multiple power levels. When the additional CPICHs are configured with multiple power levels, the base station can select the appropriate power level for each CPICH in dependence on current scheduling decisions in order to reduce inference.

42 Claims, 7 Drawing Sheets

(51) Int. Cl.
*H04B 7/06* (2006.01)
*H04W 52/32* (2009.01)

(56) References Cited

U.S. PATENT DOCUMENTS

2011/0026637 A1 2/2011 Lee et al.
2011/0053598 A1* 3/2011 Ahluwalia .................... 455/436
2013/0155968 A1* 6/2013 Pelletier et al. ............... 370/329

OTHER PUBLICATIONS

3GPP TSG RAN WG1 Meeting #68, Dresden, Germany, Feb. 6-10, 2012.*
Ericsson, "Impact of Common Pilot Gating on the 4 branch MIMO Link Performance", 3GPP TSG RAN WG1 Meeting #68, Feb. 6, 2012, pp. 1-7, R1-120353, 3GPP, Dresden, Germany.
Huawei, et al., "Further Considerations and Simulations for Pilot Design", 3GPP TSG RAN WG1 Meeting #68, Feb. 6, 2012, pp. 1-11, R1-120687, 3GPP, Dresden, Germany.
Ericsson, et al., "Common Pilot Design for Four branch MIMO System", 3GPP TSG RAN WG1 Meeting #68, Feb. 6, 2012, pp. 1-11, R1-120352, 3GPP, Dresden, Germany.
Huawei, et al., "Pilot design for DL 4-branch MIMO", 3GPP TSG-RAN WG1 Meeting #66bis, Oct. 10, 2011, pp. 1-6, R1-112978, 3GPP, Zhuhai, China.
Ericsson, et al., "Pilot design for 4-Branch MIMO", 3GPP TSG-RAN WG1 #67, Nov. 14, 2011, pp. 1-6, R1-114291, 3GPP, San Francisco, CA, USA.
Nokia Siemens Networks, et al., "Pilot design options for 4-Tx MIMO for HSDPA", 3GPP TSG RAN WG1 Meeting #66bis, Oct. 10, 2011, pp. 1-3, R1-113410, 3GPP, Zhuhai, China.
Ericsson, et al., "Initial discussion on pilot design for 4-branch MIMO", 3GPP TSG RAN WG1 Meeting #66bis, Oct. 10, 2011, pp. 1-4, R1-113431, 3GPP, Zhuhai, P.R. China.
3rd Generation Partnership Project, "Technical Specification Group Radio Access Network; UTRAN Iur interface Radio Network Subsystem Application Part (RNSAP) signalling (Release 11)", Technical Specification, TS 25 423 V11.4.0, Dec. 1, 2012, pp. 1-1185, 3GPP, France.
3rd Generation Partnership Project, "Technical Specification Group Radio Access Network; UTRAN Iub interface Node B Application Part (NBAP) signalling (Release 11)", Technical Specification, 3GPP TS 25.433 V11.3.0, Dec. 1, 2012, pp. 1-1334, 3GPP, France.
Ericsson, "Supporting MIMO with four transmit antennas", Change Request, 3GPP TSG-RAN WG3 Meeting #78, New Orleans, U.S., Nov. 12, 2012, pp. 1-49, R3-122446, 3GPP.
Ericsson, "Supporting MIMO with four transmit antennas", Change Request, 3GPP TSG-RAN WG3 Meeting #78, New Orleans, U.S., Nov. 12, 2012, pp. 1-63, R3-122445, 3GPP.
Third Generation Partnership Project. "Universal Mobile Telecommunications System (UMTS): UTRAN Iub Interface Node B Application Part (NBAP) signalling (3GPP TS 25.433 version 10.5.0 Release 10)." Jan. 2012; pp. 1-1287; Sophia Antipolis, Cedix, France.

* cited by examiner

PILOT CHANNEL CONFIGURATION FOR MIMO NETWORK

TECHNICAL FIELD

The present disclosure relates to multiple-input, multiple output (MIMO) communication networks, and more particularly, to the configuration of pilot channels for MIMO networks.

BACKGROUND

In recent years, there has been much interest in multiple input, multiple output (MIMO) networks for enhancing data rates in wireless communication networks. MIMO networks employ multiple antennas at the transmitter and receiver to transmit and receive information. The receiver can exploit the spatial dimensions of the signal at the receiver to achieve higher spectral efficiency and higher data rates without increasing bandwidth.

To support MIMO transmissions, channel estimates are needed to characterize the effective channel for each spatial layer. In WCDMA networks, the base station transmits a pilot signal to the user terminals to enable channel estimation by the user terminals. The pilot signal is transmitted to all user terminals in a cell on a common pilot channel (CPICH) and serves two purposes. First, the pilot signals enable channel state information (CSI) estimation. Based on the CSI estimates, the user terminals generate a channel quality indication (CQI), and select a suggested rank and precoder for MIMO transmissions. Second, the user terminals use the pilot signal to generate channel estimates for coherent demodulation.

In WCDMA, common pilot signals are transmitted to all user terminals in a group or cell. Release 7 of the Wideband Code Division Multiple Access (WCDMA) standard defines two common pilot channels to support for 2×2 MIMO transmissions: the Primary Common Pilot Channel (P-CPICH) and Secondary Common Pilot Channel (S-CPICH). The S-CPICH is configured together with P-CPICH for channel estimation to enable 2×2 MIMO transmissions to MIMO-enabled user terminals.

In order to support 4×4 MIMO transmissions, it is necessary to obtain four channel estimates in order to characterize each of the spatial layers. Thus, to support four-branch MIMO transmissions, two additional common pilot channels need to be defined for channel estimation. The additional pilot channels need to be transmitted with sufficient power to ensure good channel estimates when a MIMO transmission of rank three or higher is scheduled for a compliant user terminal. However, the additional pilot channels will create additional interference.

SUMMARY

Embodiments of the present disclosure provide methods and apparatus for configuring additional CPICHs, e.g. third CPICH, fourth CPICH, etc., to support MIMO transmissions of rank three or higher. According to one aspect of the disclosure, a radio network controller (RNC) sends configuration information for the additional CPICHs to the base station to configure the additional CPICHs. The additional CPICHs can be configured to have a fixed power level, or multiple power levels. New information elements are defined for the control plane signaling messages to specify the configuration of the additional CPICHs.

When the additional CPICHs are configured with multiple power levels, the base station can select the appropriate power level for each CPICH in dependence on current scheduling decisions. If the currently scheduled user terminals are not capable of receiving MIMO transmissions of rank 3 or higher, the base station can transmit the additional CPICHs at a low power level. On the other hand, if one or more of the currently scheduled user terminals are capable of receiving MIMO transmissions of rank 3 or higher, the base station can transmit the additional CPICHs at a higher power level to improve channel estimation for coherent demodulation.

When the additional CPICHs are configured with multiple power levels, the controlling RNC (CRNC) for a current serving base station can request the base station to report the power levels of the additional CPICHs. This information can be used for radio link set-up and radio resource management purposes. The base station may be configured to provide periodic measurement reports, event-triggered measurement reports, or both. The base station may also provide an immediate on-demand measurement report responsive to a request form a radio network controller.

In some embodiments, the base station can selectively turn the additional CPICHs on and off depending on the capabilities of the currently served user terminals. For example, the activation of the additional CPICHs can be conditioned on the number of user terminals in the cell having the ability to receive MIMO transmissions of rank 3 or higher. In one exemplary embodiment, the base station may stop transmission of the additional CPICHs, if none (or fewer than the predetermined number) of currently served user terminals is capable of receiving MIMO transmissions of rank 3 or higher. Transmission of the additional CPICHs can be resumed when at least one user terminal (or a predetermined number of user terminals) capable of receiving MIMO transmissions of rank 3 or higher are detected.

Exemplary embodiments of the disclosure comprise methods implemented by a radio network controller in a wireless communication network of configuring additional pilot channels in a cell having primary and secondary pilot channels to support multiple-input, multiple-output (MIMO) transmissions of rank three or higher. In one embodiment of the method, the radio network controller sends a configuration message to a serving base station. The configuration message includes configuration information for one or more additional pilot channels. The radio network controller determines a set of two or more power levels for the additional pilot channels. The radio network controller includes, in the configuration information, power level information indicating the set of two or more powers levels for each additional pilot channel.

Other embodiments of the disclosure comprise a radio network controller in a wireless communication network for configuring additional pilot channels in a cell having primary and secondary pilot channels to support multiple-input, multiple-output (MIMO) transmissions of rank three or higher. In one embodiment, the radio network controller comprises a network interface circuit for communicating with a serving base station in a cell of a wireless communication network. The control processor is configured to send a configuration message to the serving base station. The configuration message includes configuration information for one or more additional pilot channels. The control processor is further configured to determine a set of two or more power levels for the additional pilot channels, and to include, in the configuration information, power information indicating the set of two or more power levels for each additional pilot channel.

Other embodiments of the disclosure comprise methods implemented by a serving base station for a cell of a wireless communication network for supporting multiple-input, multiple-output (MIMO) transmissions of rank three or higher. In one embodiment of the method, the serving base station transmits primary and secondary pilot channels on a downlink channel. The serving base station receives, from a radio network controller, a configuration message including configuration information for one or more additional pilot channels. The configuration message includes power level information indicating a set of two or more power levels for each additional pilot channel. The serving base station selects, for each additional pilot channel, a transmit power level from a corresponding set of two or more power levels indicated in the configuration information, and transmits the additional pilot channels on the downlink channel at the selected power levels.

Other embodiments of the disclosure comprise a serving base station for a cell of a wireless communication network for supporting multiple-input, multiple-output (MIMO) transmissions of rank three or higher. In one embodiment, the serving base station comprises a transceiver circuit for communicating with user terminals, a network interface circuit for communicating with a radio network controller in the wireless communication network, and a control processor connected to the transceiver circuit and network interface circuit. The control processor is configured to control the transceiver circuit to transmit primary and secondary pilot channels on a downlink channel. The control processor is further configured to receive, from a radio network controller, a configuration message including configuration information for one or more additional pilot channels. The configuration message includes power level information indicating a set of two or more power levels for each additional pilot channel. The control processor is further configured to select, for each additional pilot channel, a transmit power level from a corresponding set of two or more power levels indicated in the configuration information, and to control the transceiver circuit to transmit the additional pilot channels on the downlink channel at the selected power levels.

Embodiments of the present disclosure provide support for 4×4 MIMO channels while reducing the impact of the additional CPICHs on legacy user terminals 20. Also, embodiments of the disclosure provide high power pilot signals to the user terminals 20 terminal as an aid in coherent demodulation and data detection.

DETAILED DESCRIPTION

Figure 1:
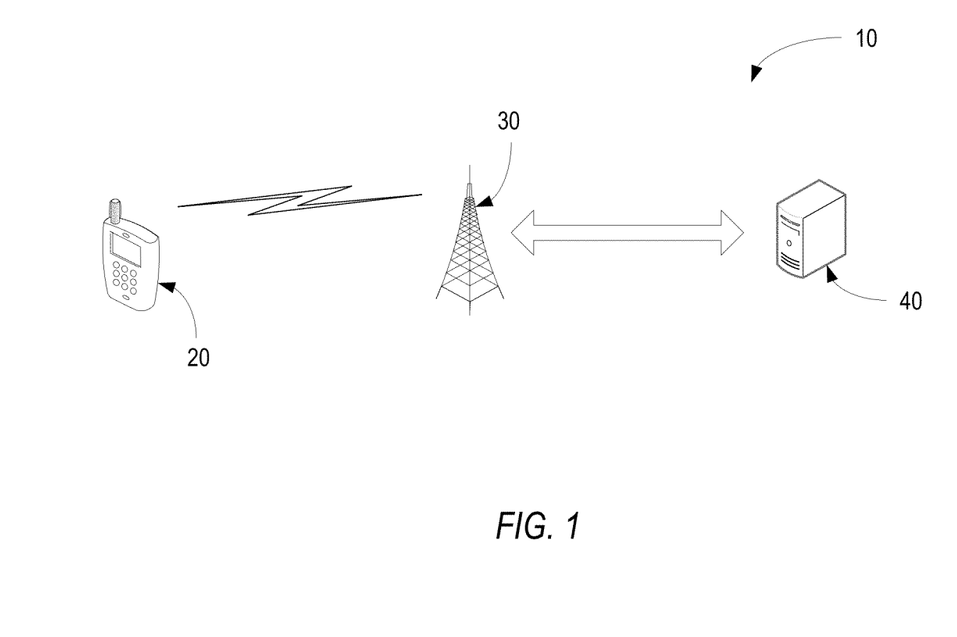
FIG. 1 illustrates components of a wireless communication network according to exemplary embodiments of the present disclosure.

FIG. 1 illustrates components of a wireless communication network 10 according to exemplary embodiments of the present disclosure. The wireless communication network 10 includes a plurality of user terminals 20, one or more base stations 30, and a radio network controller 40. The user terminals 20, referred to as user equipment (UE) in the WCDMA standard, are end-user devices, such as smart phones, mobile phones, laptop computers, or other devices with wireless communication capabilities. The user terminals 20 communicate with one or more base stations 30 that provide network access to the user terminals 20. The base stations 30, called NodeBs in the WCDMA standard, contain the radio equipment for communicating with the user terminals 20 and provides radio coverage for one or more cells or sectors in the wireless communication network 10. Typically, the wireless communication network 10 will include multiple base stations 30 providing coverage in respective cells or sectors. The RNC 40 controls the base stations 30 and provides connection to the core network (not shown). The control functions performed by the RNC 40 include call set-up and radio resource management. A single RNC 40 may control multiple base stations 30.

In exemplary embodiments of the present disclosure, the user terminals 20 and base stations 30 may be configured to support MIMO transmissions of rank three or higher. Release 7 of the WCDMA standard currently defines two pilot channels to support 2×2 MIMO transmissions: a primary common pilot channel (P-CPICH) and a secondary common pilot channel (S-CPICH). Additional CPICHs may be configured in embodiments of the present disclosure to support MIMO transmissions of rank 3 or higher.

To configure the additional common pilot channels, the RNC 40 sends configuration information for the additional CPICHs to the base station 30. New information elements are defined for the control plane signaling messages to specify the configuration of the additional CPICHs. The additional CPICHs can be configured to have a fixed power level, or multiple power levels.

In the first case, the pilot signals are transmitted continuously with fixed downlink power value. The main drawback with fixed power for common pilots is that the additional pilot channels create interference for the legacy user terminals 20 (Release 7 and Release 99). On the other hand, the power should be of sufficient quality for getting good channel estimates when a MIMO transmission of rank three or higher is scheduled for a compliant user terminal 20.

In the second case, the base station 30 can transmit the pilots signals at any one of multiple downlink power values. The RNC 40 can configure a minimum value so that the interference to the Release 7 and Release 99 user terminals 20 is reduced. The base station 30 can increase the power level above the minimum value when a MIMO transmission of rank 3 or higher is scheduled for a compliant user terminal 20. The multiple downlink power values can be pre configured so that only a specific set of downlink power values is available for selection by the base station 30.

The user terminals 20 may use the additional CPICHs for channel state information (CSI) estimation. The user terminals 20 may also use the additional CPICH for channel estimation for coherent demodulation by the user terminals 20. In some embodiments of the disclosure, specific user terminals 20 may use the additional CPICHs as a phase reference.

When the additional CPICHs are configured with multiple power levels, the controlling RNC (CRNC) 40 for a current serving base station 30 can request the base station 30 to report the power levels of the additional CPICHs. This information can be used for radio link set-up and radio resource management purposes.

Figure 2:
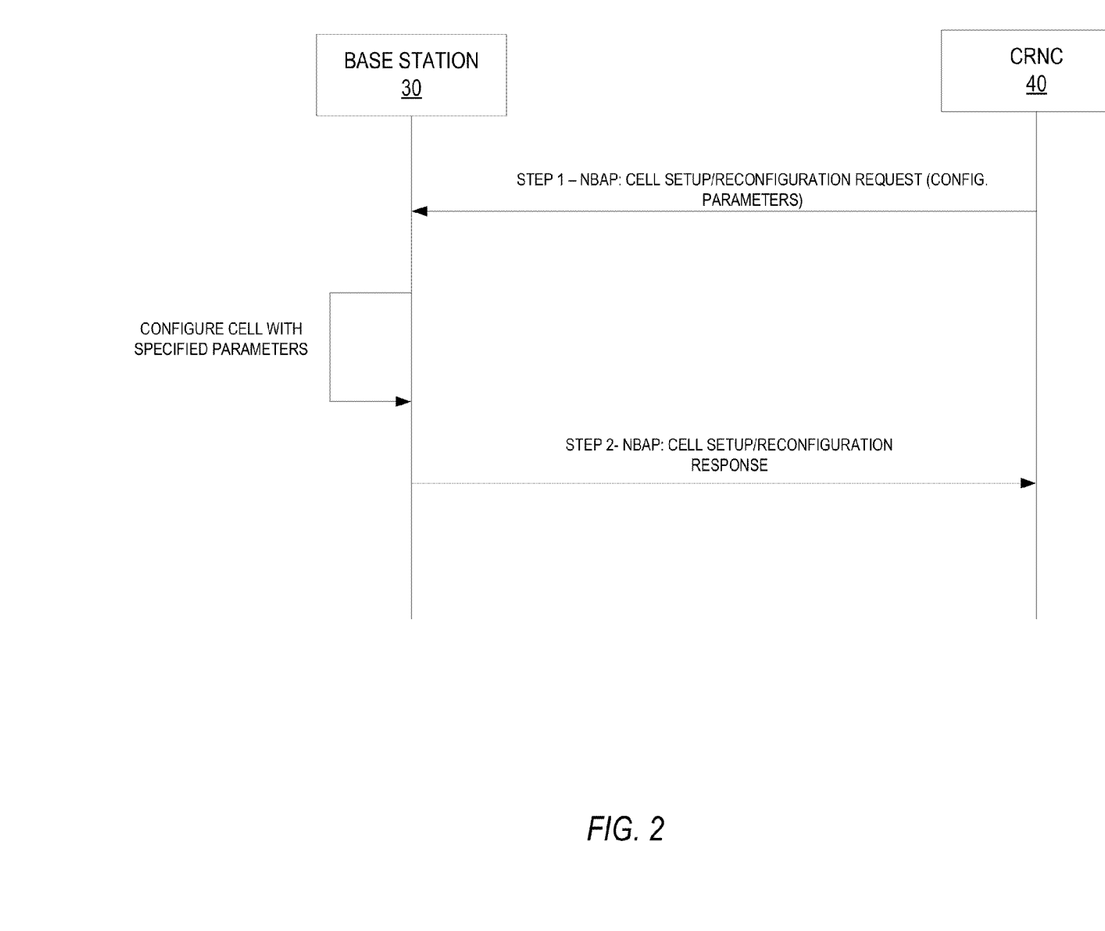
FIG. 2 illustrates a procedure for configuring additional CPICHs or MIMO transmissions of rank 3 or higher.

FIG. 2 illustrates an exemplary procedure 100 for configuring additional CPICHs according to one exemplary embodiment. The procedure 100 may be performed at the time a new cell is initially configured. Alternatively, the procedure may be performed to add an additional CPICH to an existing cell.

A CRNC 40 sends a Cell Setup Request or Cell Reconfiguration Request to the base station 30 that will provide service in the newly configured cell (step 1). The Cell Setup Request or Cell Reconfiguration Request includes configuration information for the additional CPICHs. New information elements are defined for the configuration parameters as shown in Table 1. The base station 30 configures the cell according to the parameters specified in the request (step 2) and sends a Cell Setup Response or Cell Reconfiguration Response to confirm the request (step 3).

Table 1 below shows the information elements (IEs) for an exemplary Cell Setup Request message for a WCDMA network. Reference numbers in the table refer to sections of the 3GGP TS 25.433, which define the information elements. The symbol "**" adjacent an information element indicates a new or modified information element. As shown in Table 1, the Cell Setup Request message is modified to provide configuration information for two additional CPICHs, i.e., the third and fourth common pilot channels. The configuration information includes common physical channel ID, the downlink (DL) scrambling code, the DL channelization code number, the CPICH power, and the transmit diversity indicator. Also, the MIMO Pilot Configuration IE and the MIMO Pilot Configuration Extension IE are modified to include the additional CPICHs.

TABLE 1

Information Elements in Call Setup Request Message

| IE/Group Name | Presence | Range | IE Type and Reference | Semantics Description | Criticality | Assigned Criticality |
|---|---|---|---|---|---|---|
| Message Discriminator | M | | 9.2.1.45 | | — | |
| Message Type | M | | 9.2.1.46 | | YES | reject |
| Transaction ID | M | | 9.2.1.62 | | — | |
| Local Cell ID | M | | 9.2.1.38 | | YES | reject |
| C-ID | M | | 9.2.1.9 | | YES | reject |
| Configuration Generation ID | M | | 9.2.1.16 | | YES | reject |
| T Cell | M | | 9.2.2.49 | | YES | reject |
| UARFCN | M | | 9.2.1.65 | Corresponds to Nu (TS 25.104 [14]) | YES | reject |
| UARFCN | M | | 9.2.1.65 | Corresponds to Nd (TS 25.104 [14]) | YES | reject |
| Maximum Transmission Power | M | | 9.2.1.40 | | YES | reject |
| Closed Loop Timing Adjustment Mode | O | | 9.2.2.2A | | YES | reject |
| Primary Scrambling Code | M | | 9.2.2.34 | | YES | reject |
| Synchronisation Configuration | | 1 | | | YES | reject |
| >N_INSYNC_IND | M | | 9.2.1.47A | | — | |
| >N_OUTSYNC_IND | M | | 9.2.1.47B | | — | |
| >T_RLFAILURE | M | | 9.2.1.56A | | — | |
| DLTPC Pattern 01 Count | M | | 9.2.2.13A | | YES | reject |
| Primary SCH Information | | 1 | | | YES | reject |
| >Common Physical Channel ID | M | | 9.2.1.13 | | — | |
| >Primary SCH Power | M | | DL Power 9.2.1.21 | | — | |
| >TSTD Indicator | M | | 9.2.1.64 | | — | |
| Secondary SCH Information | | 1 | | | YES | reject |
| >Common Physical Channel ID | M | | 9.2.1.13 | | — | |
| >Secondary SCH Power | M | | DL Power 9.2.1.21 | | — | |
| >TSTD Indicator | M | | 9.2.1.64 | | — | |
| Primary CPICH Information | | 1 | | | YES | reject |
| >Common Physical Channel ID | M | | 9.2.1.13 | | — | |
| >Primary CPICH power | M | | 9.2.2.33 | | — | |
| >Transmit Diversity Indicator | M | | 9.2.2.53 | | — | |
| Secondary CPICH Information | | 0 ... <maxSCPICHCell> | | | EACH | reject |
| >Common Physical Channel ID | M | | 9.2.1.13 | | — | |
| >DL Scrambling Code | M | | 9.2.2.13 | | — | |
| >FDD DL Channelisation Code Number | M | | 9.2.2.14 | | — | |
| >Secondary CPICH Power | M | | DL Power 9.2.1.21 | | — | |

TABLE 1-continued

Information Elements in Call Setup Request Message

| IE/Group Name | Presence | Range | IE Type and Reference | Semantics Description | Criticality | Assigned Criticality |
|---|---|---|---|---|---|---|
| >Transmit Diversity Indicator | M | | 9.2.2.53 | | — | |
| Primary CCPCH Information | | 1 | | | YES | reject |
| >Common Physical Channel ID | M | | 9.2.1.13 | | — | |
| >BCH Information | | 1 | | | — | |
| >>Common Transport Channel ID | M | | 9.2.1.14 | | — | |
| >>BCH Power | M | | DL Power 9.2.1.21 | | — | |
| >STTD Indicator | M | | 9.2.2.48 | | — | |
| Limited Power Increase Information | | 1 | | | YES | reject |
| >Power_Raise_Limit | M | | 9.2.2.29A | | — | |
| >DL_power_averaging_window_size | M | | 9.2.2.12A | | — | |
| IPDL Parameter Information | | 0 ... 1 | | | YES | reject |
| >IPDL FDD Parameters | M | | 9.2.2.18C | | — | |
| >IPDL Indicator | M | | 9.2.1.36F | | — | |
| Cell Portion Information | | 0 ... <maxno ofCellPortions> | | | EACH | reject |
| >Cell Portion ID | M | | 9.2.2.1Ca | | — | |
| >Associated Secondary CPICH | M | | Common Physical Channel ID 9.2.1.13 | | — | |
| >Maximum Transmission Power for Cell Portion | M | | Maximum Transmission Power 9.2.1.40 | | — | |
| MIMO Pilot Configuration** | O | | 9.2.2.73 | | YES | reject |
| MIMO Pilot Configuration Extension** | O | | 9.2.2.120 | Can only be present if the MIMO Pilot Configuration IE is present | YES | reject |
| Third CPICH Information** | | 0 ... <maxT CPICHCell> | | Maximum number of Third CPICHs that can be defined in a Cell. | EACH | reject |
| >Common Physical Channel ID** | M | | 9.2.1.13 | | — | |
| >DL Scrambling Code | M | | 9.2.2.13 | | — | |
| >FDD DL Channelisation Code Number** | M | | 9.2.2.14 | | — | |
| >Third CPICH Power | M | | Addition CPICH DL Power 9.2.x.y | | — | |
| >Transmit Diversity Indicator** | M | | 9.2.2.53 | | — | |
| Fourth CPICH Information** | | 0 ... <maxF CPICHCell> | | Maximum number of Fourth CPICHs that can be defined in a Cell. | EACH | reject |
| >Common Physical Channel ID** | M | | 9.2.1.13 | | — | |
| >DL Scrambling Code** | M | | 9.2.2.13 | | — | |
| >FDD DL Channelisation Code Number** | M | | 9.2.2.14 | | — | |
| >Fourth CPICH Power** | M | | Addition CPICH DL Power 9.2.x.y | | — | |
| >Transmit Diversity Indicator** | M | | 9.2.2.53 | | — | |

As previously noted, the CRNC 40 can configure the additional CPICHs to have a fixed power level or multiple power levels. In the first case, the CRNC specifies the fixed power level for each additional CPICH in the CPICH power IE. The power level may be an absolute power level or a relative power level related to the primary CPICH, e.g. −30 dB. The additional CPICHs may have different power levels. In the second case, the CRNC 40 may specify a range in the CPICH power IE, e.g. −30 to 19 dB. Where a range is specified, the base station 30 may select any value in the specified range. Alternatively, the CRNC 40 may provide a list of discrete power level values and the base station 30 may be limited to selection of one of the specified power level values.

In WCDMA, the RNC 40 is responsible for setting up radio links for the user terminals 20. When a user terminal 20 with 4-branch MIMO capability is detected, the RNC 40 can setup a radio link for 4×4 MIMO transmissions. The radio link setup can be achieved by adding a new 4-branch MIMO Activation Indication into Node B Application Part (NBAP) and Radio Network Subnetwork Application Part (RNSAP) messages sent from the RNC 40 to the base station 30. For example, the 4-branch MIMO Activation Indication may be included in a Radio Link Setup Request, Radio Link Addition Request, or Radio Link Reconfiguration Prepare message.

If the additional CPICHs have multiple power levels, the CPICH power for the additional CPICHs used by the base station 30 needs to be signaled back to RNC 40 when a new radio link is set up. For this purpose, new IEs may be added in the NBAP and/or RNSAP messages sent from base station 30 the RNC 40. For example, the CPICH power for each additional CPICH may be included in a Radio Link Setup Response, Radio Link Addition Response, Radio Link Reconfiguration Ready, or Radio Link Reconfiguration Response.

If the additional CPICHs have multiple power levels, the base station 30 may change the CPICH power for the additional CPICHs while 4×4 MIMO radio links are set up. In this case, the base station 30 needs to notify the power change to RNC 40 for these radio links. This notification can be achieved by adding new IEs in the existing NBAP/RNSAP message Radio Link Parameter Update Indication. When RNC 40 receives the new CPICH power for the additional CPICHs, it needs to notify the user terminal 20 that is affected by the change.

New IEs for the additional CPICHs may also be added in Radio Resource Control (RRC) messages transmitted between the RNC 40 and user terminal 20. These new IEs can be used to provide configuration information to the user terminal 20 to setup a 4×4 MIMO radio link or to reconfigure an established 4×4 MIMO radio link. The configuration information includes, for example, the scrambling code, channelization code, power offset, etc.

Figure 3:
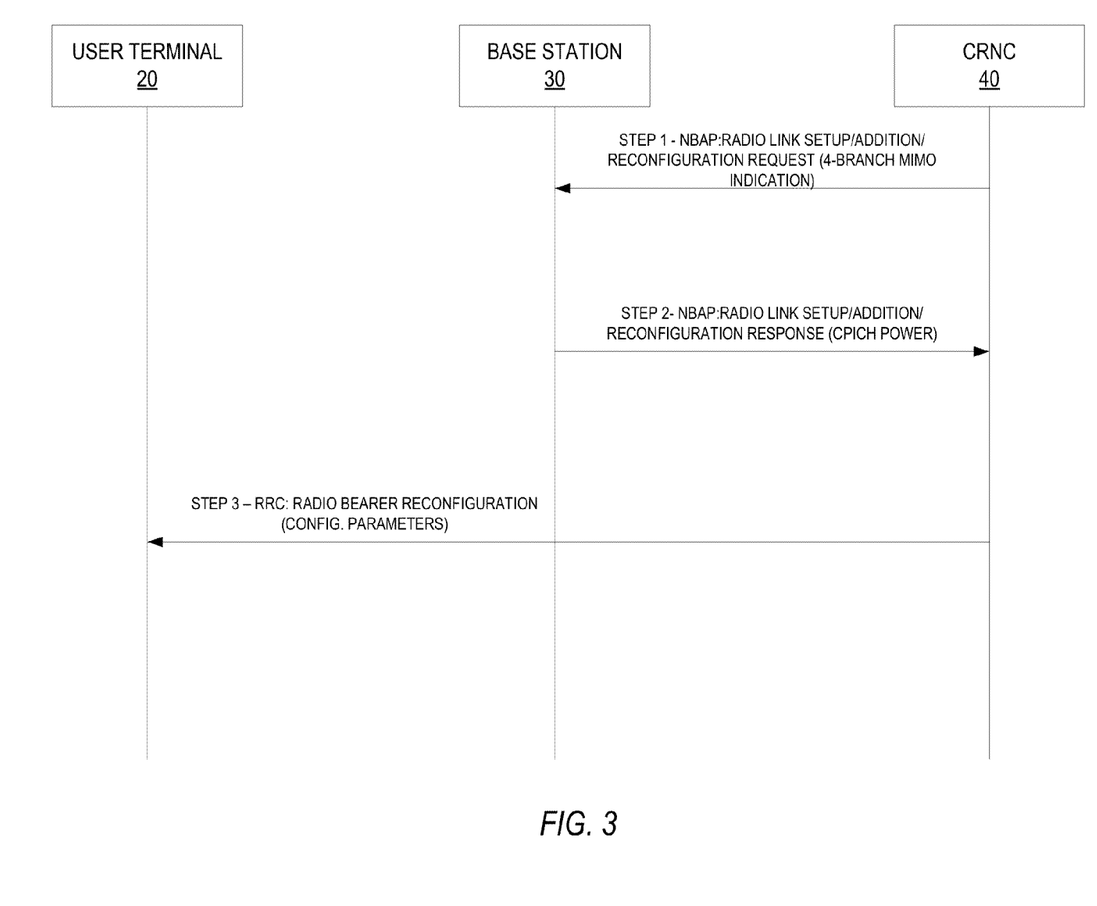
FIG. 3 illustrates a procedure for setting up a radio link for MIMO transmission of rank 3 or higher.

FIG. 3 illustrates a procedure 200 for setting up a radio link for MIMO transmission of rank 3 or higher. The RNC 40 sends a radio link control message to the base station 30 serving the cell where the user terminal 20 is located (step 1). The request message includes a 4-branch MIMO Activation Indication. The radio link control message may, for example, comprise a Radio Link Setup Request, a Radio Link Addition Request, or a Radio Link Reconfiguration Request. In some embodiments, the radio link control message may further include an indication that the additional CPICHs can be used as a phase reference. In response to the radio link control message, the base station 30 sends a radio link control response including the CPICH power for the additional CPICHs in its response to the request (step 2). The radio link control response may comprise a Radio Link Setup Response, a Radio Link Addition Response, or a Radio Link Reconfiguration Response. After receiving the response from the base station 30, the RNC 40 sends a RRC message to the user terminal 20 containing configuration information for the additional CPICHs (step 3). The configuration information includes the CPICH powers for the additional CPICHs provided by the base station 30.

The RNC 40 may request base station 30 to report the DL CPICH power for the additional CPICHs on demand, periodically, and/or in response to predetermined events. For example base station 30 can report the CPICH power for the additional CPICHs power each time the power is changed, or at predetermined time intervals, or both.

Figure 4:
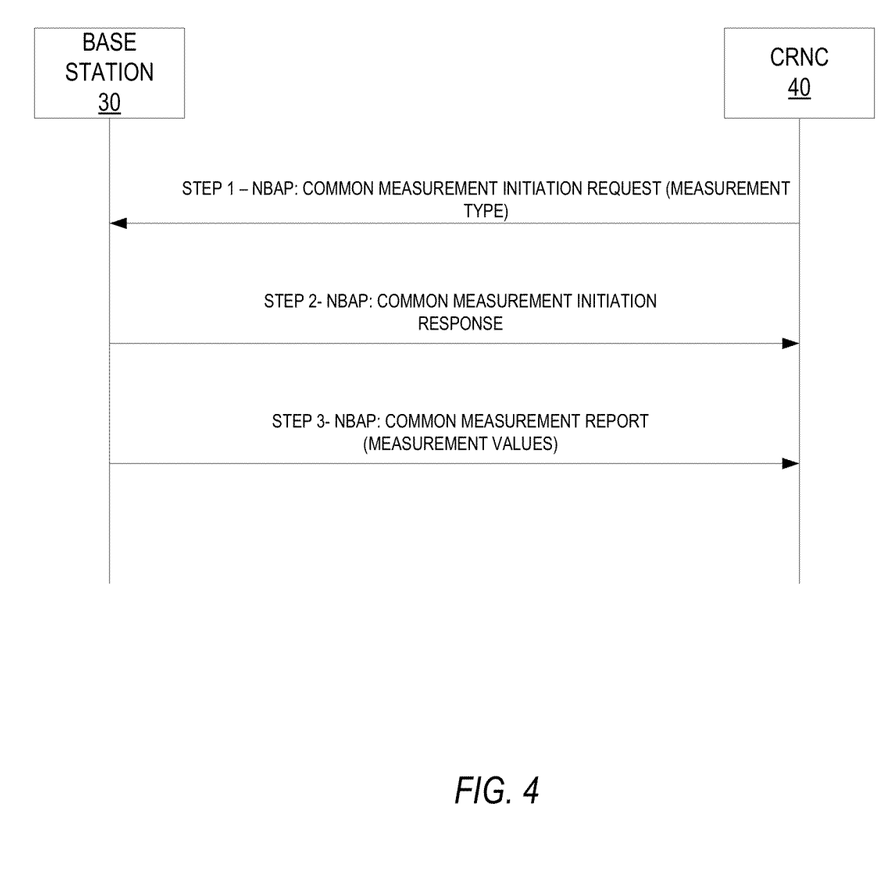
FIG. 4 illustrates a procedure for configuring reporting between a base station and radio network controller.

FIG. 4 illustrates an exemplary procedure for configuring updates for the CPICH power in scenarios where multiple power levels are configured for the additional CPICHs. The CRNC 40 may send a Common Measurement Initiation Request to the base station 30 to configure reporting of the power level for the additional CPICHs (step 1). The base station 30 may be configured to report the power levels of the additional CPICHs periodically, in response to predetermined events (e.g., when the power level is changed by the base station 30), or both. The base station 30 may also be requested by the RNC 40 to provide an immediate, on-demand measurement report. The type of reporting is indicated by the Measurement Type IE in the Common Measurement Initiation Request. The Measurement Type IE can be set to request periodic measurement reports, event-triggered measurement reports, or both. The Measurement Type IE can be set to request an immediate, on-demand report. The base station 30 sends a Common Measurement Initiation Response to confirm the request (step 2). The Common Measurement Initiation Response may include the current power levels for the additional CPICHs. Thereafter, the base station 30 sends a common measurement report to the CRNC 40 indicating the current power level for each additional CPICH, or for specified ones of the additional CPICHs (step 3). The measurement report may be sent at periodic intervals, or responsive to specified events, e.g. when the power is changed.

In some embodiments, new messages can be defined to configure the additional CPICHs. New messages can also be used to configure power level updating between the base station 30 and RNC 40 when the additional CPICHs have multiple power levels. The new messages can be part of the NBAP/RNSAP signaling plane. Alternatively, the new messages could be introduced in the Iub/Iur frame protocols for the common channels, e.g. Fast Access Channel (FACH) and Random Access Channel (RACH).

Figure 5:
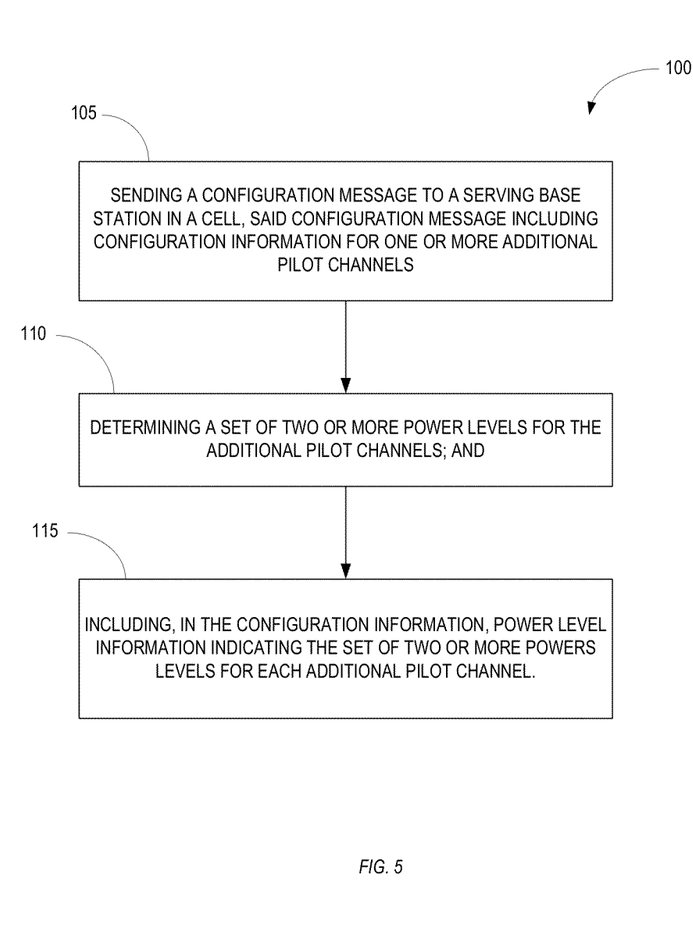
FIG. 5 illustrates an exemplary method implemented by a radio network controller for configuring additional pilot channels to support MIMO transmissions of rank 3 or higher.

FIG. 5 illustrates an exemplary method 100 implemented by a RNC 40 in a wireless communication network 10 of configuring additional pilot channels in a cell to support multiple input, multiple output (MIMO) transmissions of rank 3 or higher. The RNC 40 sends a configuration message (e.g. Cell Set-Up Request or Cell Reconfiguration Request) to a servicing base station 30 in a cell (block 105). The configuration message includes configuration information for additional pilot channels. The RNC 40 determines a set of two or more power levels for each additional pilot channel (block 110). In some embodiments, a single set of power levels is determined for all additional pilot channels. In other embodiments, a separate set of power levels is determined for each additional pilot channel. The RNC 40 includes, in the configuration information, power level information indicating the set of power levels for each additional pilot channel (block 115). The RNC 40 may specify the power levels as absolute power levels. In other embodiments, the RNC 40 may specify the power levels as relative power levels. For example, the RNC 40 may specify a power offset relative to the primary pilot channel. The set of two or more power levels may be indicated as a range of powers, i.e., by specifying the minimum and maximum power levels in the range. In other embodiments, the set of two or more power levels may be indicated by a list of power level values.

Figure 6:
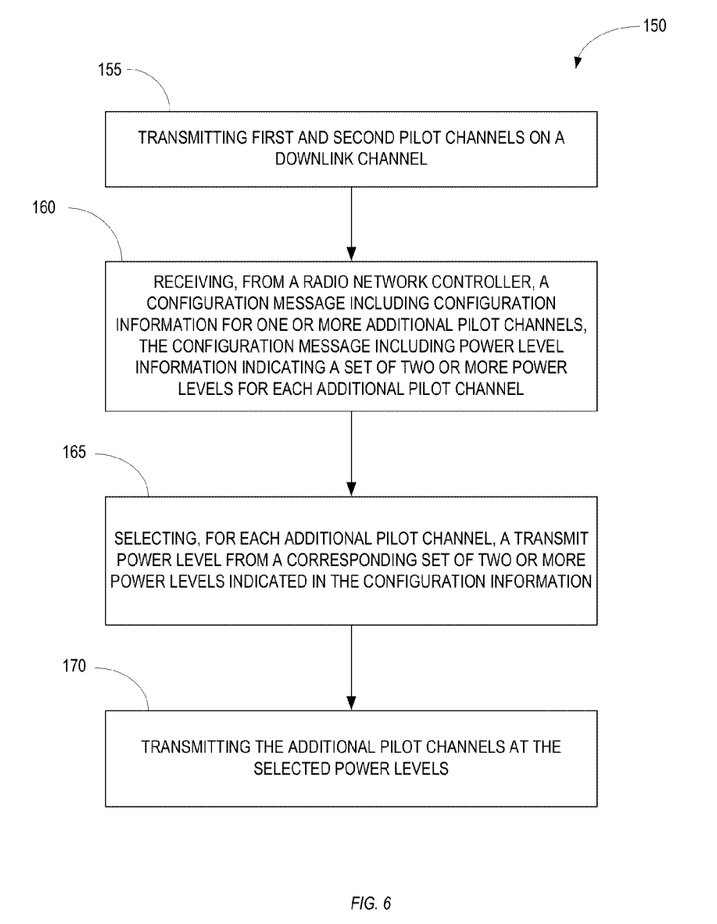
FIG. 6 illustrates an exemplary method implemented by a serving base station for supporting MIMO transmissions of rank 3 or higher.

FIG. 6 illustrates an exemplary method implemented by a serving base station 30 for a cell of a wireless communication network 10 for supporting multiple input, multiple output (MIMO) transmissions of rank 3 or higher. The serving base station 30 transmits first and second pilot channels to support MIMO transmissions of rank 1 and 2 (block 155). The serving base station 30 receives a configuration message (e.g. Cell Set-Up Request or Cell Reconfiguration Request) from a RNC 40 including configuration information for one or more additional pilot channels (block 160). The configuration message includes a set of two or more power levels for each additional pilot channel. In response to the configuration message, the serving base station 30 selects a power level for each additional CPICH (block 165) and transits the additional CPICHs at the selected power levels (block 170).

Figure 7:
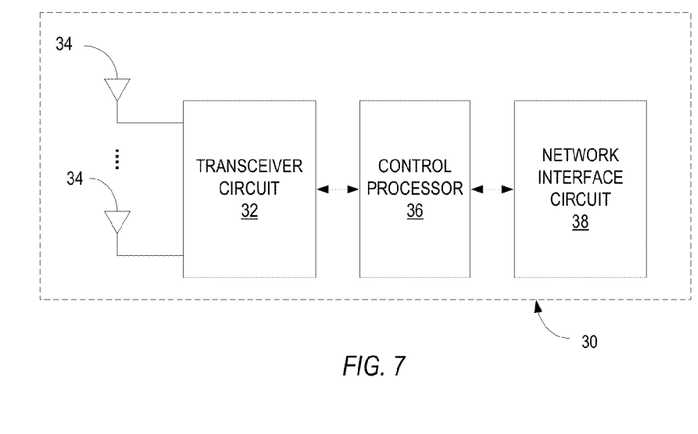
FIG. 7 illustrates an exemplary base station configured to support MIMO transmission of rank 3 or higher.

FIG. 7 illustrates an exemplary base station 30 configured to support MIMO transmission of rank 3 or higher. The base station 30 comprises a spatial multiplexing transceiver 32 coupled to four antennas 34. Those skilled in the art will appreciate that the number of antennas 34 is not a material aspect of the disclosure and that the present disclosure could be applied to embodiments with five or more antenna 34. In the exemplary embodiment, the transceiver circuit 32 is configured to operate according to the WCDMA standard. The present disclosure, however is not limited to use in WCDMA systems and skilled in the art will appreciate that the present disclosure is more generally applicable to any wireless communication system using MIMO. A control processor 36 controls operation of the base station 30. The function of the control processor include configuration of the cells served by the base station 30 as herein described. The control processor 36 may comprise one or more microprocessors, hardware, firmware or a combination thereof. A network interface circuit 38 connects the base station 30 to a signaling network for communicating with the RNC 40. The network interface circuit 38 may comprise, for example, an Ethernet interface.

Figure 8:
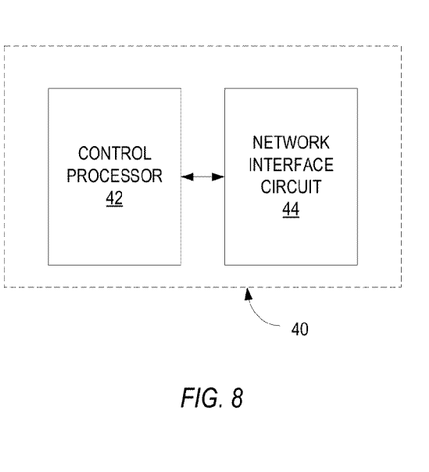
FIG. 8 illustrates an exemplary radio network controller configured to support MIMO transmission of rank 3 or higher.

FIG. 8 illustrates an exemplary RNC 40 configured to support MIMO transmission of rank 3 or higher. The RNC 40 includes a network interface circuit 42 to connect the RNC to a signaling network and a control processor 44. The network interface circuit 42 may comprise, for example, an Ethernet interface. The RNC 42 uses the network interface circuit 42 to send control plane data to and receive control plane data from the base station 30 and user terminal 20. The network interface circuit 42 may also be used to forward user plane data between the user terminal 20 and core network. The control processor 44 performs functions such as cell-setup, cell reconfiguration, and radio resource management as herein described. The control processor 44 may comprise one or more microprocessors, hardware, firmware or a combination thereof.

Embodiments of the present disclosure provide support for 4×4 MIMO channels while reducing the impact of the additional CPICHs on legacy user terminals 20. Also, embodiments of the disclosure provide high power pilot signals to the user terminals 20 terminal as an aid for coherent demodulation and data detection.

What is claimed is:

1. A method, implemented by a radio network controller in a wireless communication network, of configuring additional pilot channels in a cell having primary and secondary pilot channels to support multiple-input, multiple-output (MIMO) transmissions of rank three or higher, the method comprising:
   sending a configuration message to a serving base station in a cell having one or more pilot channels configured, said configuration message including configuration information for one or more additional pilot channels;
   determining a set of two or more power levels for the additional pilot channels; and
   including, in the configuration information, power level information indicating the set of two or more powers levels for each additional pilot channel;
   sending a measurement initiation request to the base station to configure reporting, by the base station, of the power levels of the additional pilot channels, said measurement initiation request indicating a type of reporting selected from a plurality of types of reporting performed by the base station.

2. The method of claim 1, wherein the set of two or more power levels for the additional pilot channels comprises a range of powers for each additional pilot channel; and wherein the power level information indicates the range of powers.

3. The method of clam 1, wherein the set of two or more power levels for the additional pilot channels comprises a set of two or more discrete power levels for each additional pilot channel; and wherein the power level information comprises a list of the two or more discrete power levels.

4. The method of claim 1, wherein the measurement initiation request includes a measurement type information element set to request periodic measurement reports by the base station.

5. The method of claim 1, wherein the measurement initiation request includes a measurement type information element set to request event triggered measurement reports by the base station.

6. The method of claim 1, wherein the measurement initiation request includes a measurement type information element set to request immediate on-demand measurement reports by the base station.

7. The method of claim 1, further comprising receiving, responsive to the measurement initiation request, a measurement report from said base station.

8. The method of claim 1, wherein the power level information comprises a relative power level indicating the power level of the additional pilot channels relative to a primary pilot channel.

9. The method of claim 1, wherein determining a set of two or more power levels for the additional pilot channels comprises determining a single set of power levels is determined for all additional pilot channels.

10. The method of claim 1, wherein determining a set of two or more power levels for the additional pilot channels comprises determining a separate set of power levels is determined for each additional pilot channels.

11. The method of claim 1, wherein said configuration information for one or more additional pilot channels are defined by adding separate information elements in the configuration message, said separate information elements are different from information elements defined for the one or more pilot channels.

12. The method of claim 1, wherein said plurality types of reporting performed by the base station comprises periodic measurement reporting, event triggered measurement reporting, and immediate on-demand measurement reporting.

13. A radio network controller, in a wireless communication network, for configuring additional pilot channels in a cell having primary and secondary pilot channels to support multiple-input, multiple-output (MIMO) transmissions of rank three or higher, the radio network controller comprising:
- a network interface circuit for communicating with a serving base station in a cell managed by the radio network controller; and
- a control processor for controlling the radio base station, said control processor being configured to:
  - send a configuration message to a serving base station in a cell having one or more pilot channels configured, said configuration message including configuration information for one or more additional pilot channels;
  - determine a set of two or more power levels for the additional pilot channels;
  - include, in the configuration information, power information indicating the set of two or more power levels for each additional pilot channel;
  - send a measurement initiation request to the base station to configure reporting, by the base station, of the power levels of the additional pilot channels, said measurement initiation request indicating a type of reporting selected from a plurality of types of reporting performed by the base station.

14. The radio network controller of claim 13, wherein the set of two or more power levels comprise a range of powers for each additional pilot channel, and wherein the power level information indicates the range of powers.

15. The radio network controller of clam 13, wherein the set of two or more power levels comprise two or more discrete power levels for each additional pilot channel, and wherein the power information includes a list of the two or more discrete power levels.

16. The radio network controller of claim 13, wherein the control processor is further configured to include, in the measurement initiation request, a measurement type information element set to request periodic measurement reports by the base station.

17. The radio network controller of claim 13, wherein the control processor is further configured to include, in the measurement initiation request, a measurement type information element set to request event triggered measurement reports by the base station.

18. The radio network controller of claim 13, wherein the control processor is further configured to include, in the measurement initiation request, a measurement type information element set to request an immediate on-demand measurement report by the base station.

19. The radio network controller of claim 13, wherein the control processor is further configured to receive, responsive to the measurement initiation request, a measurement report from said base station.

20. The radio network controller of claim 13, wherein the power level information comprises a relative power level indicating the power level of the additional pilot channels relative to a primary pilot channel.

21. The radio network controller of claim 13, wherein the control processor is further configured to determine a single set of power levels is determined for all additional pilot channels.

22. The radio network controller of claim 13, wherein the control processor is further configured to determine a separate set of power levels is determined for each additional pilot channels.

23. A method, implemented by a serving base station for a cell of a wireless communication network, for supporting multiple-input, multiple-output (MIMO) transmissions of rank three or higher, the method comprising:
- transmitting primary and secondary pilot channels on a downlink channel;
- receiving, from a radio network controller, a configuration message including configuration information for one or more additional pilot channels, the configuration message including power level information indicating a set of two or more power levels for each additional pilot channel;
- selecting, for each additional pilot channel, a transmit power level from a corresponding set of two or more power levels indicated in the configuration information;
- transmitting the additional pilot channels on the downlink channel at the selected power levels
- receiving a measurement initiation request from the radio network controller, said measurement initiation request indicating a type of reporting selected from a plurality of types of reporting performed by the base station; and
- configuring, responsive to the measurement initiation request, measurement reporting to report the power levels of the additional pilot channels to the radio network controller.

24. The method of claim 23, wherein the set of two or more power levels for the additional pilot channels comprises a range of powers for each additional pilot channel; and wherein the power level information indicates the range of powers.

25. The method of clam 23, wherein the set of two or more power levels for the additional pilot channels comprises a set of two or more discrete power levels for each additional pilot channel; and wherein the power level information comprises a list of the two or more discrete power levels.

26. The method of claim 23, further comprising sending periodic measurement reports from the base station to the radio network controller, said measurement report indicating the power levels of the additional pilot channels.

27. The method of claim 23, further comprising detecting a triggering event and sending a measurement report from the base station to the radio network controller, said measurement report indicating the power levels of the additional pilot channels.

28. The method of claim 23, further comprising sending, responsive to the measurement initiation request, an immediate on-demand measurement report from said base station to said radio network controller, said measurement report indicating the power levels of the additional pilot channels.

29. The method of claim 23, further comprising selectively transmitting the additional pilot channels depending on capabilities of service user terminals currently served by the base station.

30. The method of claim 23, wherein selecting, for each additional pilot channel, a transmit power level from a corresponding set of two or more power levels indicated in the configuration information comprises selecting one of said two or more power levels for the additional pilot channels depending on the capabilities of the currently scheduled user terminals.

31. The method of claim 30, wherein selecting one of said two or more power levels for the additional pilot channels depending on the capabilities of the currently scheduled user terminals comprises selecting one of said two or more power levels for the additional pilot channels depending on a number of currently scheduled user terminals capable of MIMO transmission of rank three or higher.

32. The method of claim 23, further comprising:
- receiving a radio link control message form the radio network controller; and sending, responsive to the radio link control message, a radio link control response including the selected power levels for the additional pilot channels.

33. A serving base station for a cell of a wireless communication network for supporting multiple-input, multiple-output (MIMO) transmissions of rank three or higher, the serving base station comprising:
   a transceiver circuit for communicating with user terminals;
   a network interface circuit for communicating with a radio network controller in the wireless communication network; and
   a control processor connected to the transceiver circuit and network interface circuit and configured to:
      control the transceiver circuit to transmit primary and secondary pilot channels on a downlink channel;
      receive, from a radio network controller, a configuration message including configuration information for one or more additional pilot channels, the configuration message including power level information indicating a set of two or more power levels for each additional pilot channel;
      select, for each additional pilot channel, a transmit power level from a corresponding set of two or more power levels indicated in the configuration information;
      control the transceiver circuit to transmit the additional pilot channels on the downlink channel at the selected power levels
      receive a measurement initiation request from the radio network controller, said measurement initiation request indicating a type of reporting selected from a plurality of types of reporting performed by the base station; and
      configure, responsive to the measurement initiation request, measurement reporting to report the power levels of the additional pilot channels to the radio network controller.

34. The serving base station of claim 33, wherein the set of two or more power levels for the additional pilot channels comprises a range of powers for each additional pilot channel; and wherein the power level information indicates the range of powers.

35. The serving base station of claim 33, wherein the set of two or more power levels for the additional pilot channels comprises a set of two or more discrete power levels for each additional pilot channel; and wherein the power level information comprises a list of the two or more discrete power levels.

36. The serving base station of claim 33, wherein the control processor is further configured to send periodic measurement reports from the base station to the radio network controller, said measurement reports indicating the power levels of the additional pilot channels.

37. The serving base station of claim 33, wherein the control processor is further configured to send a measurement report from the base station to the radio network controller, said measurement report indicating the power levels of the additional pilot channels.

38. The serving base station of claim 33, wherein the control processor is further configured to send, responsive to the measurement initiation request, an immediate on-demand measurement report from said base station to said radio network controller, said measurement report indicating the power levels of the additional pilot channels.

39. The serving base station of claim 33, wherein the control processor is further configured to control the transceiver circuit to selectively transmit the additional pilot channels depending on capabilities of service user terminals currently served by the base station.

40. The serving base station of claim 33, wherein the control processor is further configured to select one of said two or more power levels for the additional pilot channels depending on the capabilities of the currently scheduled user terminals.

41. The serving base station of claim 40, wherein the control processor is further configured to select one of said two or more power levels for the additional pilot channels depending on a number of currently scheduled user terminals capable of MIMO transmission of rank three or higher.

42. The serving base station of claim 33, wherein the control processor is further configured to:
   receive a radio link control message form the radio network controller; and
   send, responsive to the radio link control message, a radio link control response including the selected power levels for the additional pilot channels.

* * * * *